(12) United States Patent
Jin et al.

(10) Patent No.: US 9,981,408 B2
(45) Date of Patent: May 29, 2018

(54) FABRICATION AND REPLICATION OF POLYMER OPTICAL WAVEGUIDES

(71) Applicant: City University of Hong Kong, Kowloon (HK)

(72) Inventors: Wei Jin, New Territories (HK); Kin Seng Chiang, Kowloon (HK); Hau Ping Andy Chan, New Territories (HK)

(73) Assignee: City University of Hong Kong, Kowloon (HK)

( * ) Notice: Subject to any disclaimer, the term of this patent is extended or adjusted under 35 U.S.C. 154(b) by 708 days.

(21) Appl. No.: 14/222,837

(22) Filed: Mar. 24, 2014

(65) Prior Publication Data

US 2016/0158968 A1 Jun. 9, 2016

Related U.S. Application Data

(60) Provisional application No. 61/951,692, filed on Mar. 12, 2014.

(51) Int. Cl.
| | |
|---|---|
| *B29C 33/38* | (2006.01) |
| *B29C 33/42* | (2006.01) |
| *G02B 6/00* | (2006.01) |
| *B29K 83/00* | (2006.01) |
| *B29L 31/00* | (2006.01) |
| *B29C 59/02* | (2006.01) |

(52) U.S. Cl.
CPC .............. *B29C 33/424* (2013.01); *G02B 6/00* (2013.01); *B29C 2059/023* (2013.01); *B29K 2083/00* (2013.01); *B29L 2031/757* (2013.01)

(58) Field of Classification Search
CPC ... B29C 33/424; B29C 2059/023; G02B 6/00; B29L 2031/757; B29K 2083/00
USPC ....... 264/1.1, 1.24, 1.38, 293, 494; 425/385, 425/174.4
See application file for complete search history.

(56) References Cited

U.S. PATENT DOCUMENTS

| | | | | |
|---|---|---|---|---|
| 7,077,992 | B2* | 7/2006 | Sreenivasan | B81C 1/0046 264/259 |
| 8,100,684 | B2* | 1/2012 | Kruijt-Stegeman | B29C 59/022 264/293 |
| 2008/0042319 | A1* | 2/2008 | Ando | B29C 43/003 264/293 |
| 2010/0074585 | A1* | 3/2010 | Shimizu | G02B 6/4224 385/129 |
| 2011/0279000 | A1* | 11/2011 | Kim | F25D 23/02 312/204 |

(Continued)

OTHER PUBLICATIONS

D. Zhu et al "Environmental Stability of PDMS-waveguide for electrical-optical circuit board" Electronic Letters, May 24, 2007, vol. 43, No. 11 (pp. 1-2).*

(Continued)

*Primary Examiner* — Nahida Sultana
(74) *Attorney, Agent, or Firm* — Amin, Turocy & Watson, LLP

(57) ABSTRACT

Polymer optical waveguides can be produced by separating the processes into a distinct embossing process and a distinct UV exposure process. Separating the processes can create a more refined product and a more efficient process, thus eliminating the need for special polymer optical waveguide fabrication machinery.

20 Claims, 5 Drawing Sheets

(56) References Cited

U.S. PATENT DOCUMENTS

| | | | | |
|---|---|---|---|---|
| 2011/0300646 A1* | 12/2011 | Miyoshi | ............... | B82Y 10/00 |
| | | | | 438/14 |
| 2012/0025420 A1* | 2/2012 | Utashiro | ............. | B29C 43/021 |
| | | | | 264/293 |
| 2012/0256346 A1* | 10/2012 | Ogino | ................. | B81C 1/0046 |
| | | | | 264/293 |
| 2013/0216177 A1* | 8/2013 | Tseng | ............... | G02B 6/12004 |
| | | | | 385/14 |
| 2015/0309370 A1* | 10/2015 | Park | ..................... | B29C 59/04 |
| | | | | 428/156 |
| 2016/0009006 A1* | 1/2016 | Mizuta | ................... | C08L 83/04 |
| | | | | 264/293 |
| 2016/0158972 A1* | 6/2016 | Park | ..................... | G03F 7/0002 |
| | | | | 427/133 |

OTHER PUBLICATIONS

Guan et al, An EpoClad/EpoCore-based platform for MOEMS fabrication, Published Oct. 30, 2013, IOP Publishing Ltd Journal of Micromechanics and Microengineering, vol. 23, No. 12.*

"Negative Photoresists for UV & Electron Beam Lithography" Micro resist Technology Gmbh (2009).*

\* cited by examiner

FABRICATION AND REPLICATION OF POLYMER OPTICAL WAVEGUIDES

CROSS-REFERENCE TO RELATED APPLICATIONS

This application claims the benefit of priority to Provisional Patent Ser. No. 61/951,692 filed Mar. 12, 2014 and entitled "FABRICATION AND REPLICATION OF POLYMER OPTICAL WAVEGUIDES", the entirety of which is incorporated herein by reference.

TECHNICAL FIELD

This disclosure relates generally to fabrication and replication of polymer optical waveguides. For instance, this disclosure relates to a unique process for fabricating and replicating polymer optical waveguides.

BACKGROUND

Polymer optical waveguide devices play a key role in several rapidly developing areas of broadband communications, such as optical networking, metropolitan/access communications, and computing systems due to their easier processing and integration over inorganic counterparts. Because optical waveguide-based devices play a key role in communication systems that require signals to be processed optically at an ultrahigh speed, a low-cost material system and fabrication process suitable for mass production are desired to reduce the cost of integration. Fabrication and replication of polymer optical waveguides can involve several different processes such as embossing. An existing embossing process requires simultaneous application of ultraviolet ("UV") radiation, pressure, and heat, which means that certain mechanical components and the mold must be UV transparent. Such a requirement is difficult to achieve in practice and can be incompatible with existing printed circuit board ("PCB") production facilities.

Another deficiency of existing embossing is the generation of air bubbles during embossing. When the mold is pressed onto the polymer coated substrate, air bubbles can become trapped between the substrate and the mold. To eliminate air bubbles, vacuum treatment is usually used, which adds considerable complexity and expense to the process; sometimes, it may not even be possible to eliminate the air bubbles by vacuum treatment. Although special injected molding machines allow simultaneous application of UV radiation, pressure, and heat, these machines are complicated, expensive to build, and offer limited plate areas.

This background relating to fabrication and replication of polymer optical waveguides is merely intended to provide a contextual overview of some current optical waveguide fabrication technology, and is not intended to be exhaustive. Other context regarding current state may become apparent upon review of the following detailed description.

SUMMARY

A simplified summary is provided herein to help enable a basic or general understanding of various aspects of exemplary, non-limiting embodiments that follow in the more detailed description and the accompanying drawings. This summary is not intended, however, as an extensive or exhaustive overview. Instead, the purpose of this summary is to present some concepts related to some exemplary non-limiting embodiments in simplified form as a prelude to more detailed description of the various embodiments that follow in the disclosure.

A UV-based embossing process suitable for mass production of waveguide-embedded optical PCBs is provided in various embodiments using a traditional PCB manufacturing facility. In one or more embodiments, the curing process is split into two steps during embossing, so that, e.g., the use of a specially made molding machine is no longer needed.

In one or more embodiments, production of waveguide-embedded optical PCBs is separated into a two step process: 1) embossing and, 2) UV exposure. Splitting the aforementioned processes frees such embodiments from the use of a machine press plate that is UV transparent. Consequently, the waveguide fabrication process is improved and can be used to facilitate PCB lamination process(es). In order to separate the embossing and the UV exposure, in various embodiments, the UV-curable polymer deposited on the substrate is first solidified by heat or a blow process.

The mold can then be pressed onto the solidified polymer with a high pressure to squeeze out air; the temperature can be increased concurrently to soften the polymer so that the mold can be filled with the polymer. The solidification process before embossing gives two advantages. First, the embossed polymer is in a solid, yet elastic state (since it is not fully cured), so that the mold can be kept in tight contact with the polymer to ensure the fidelity of replication even after the relief of the pressure. Second, tight contact between the mold and the polymer does not allow air bubbles to be formed, freeing such embodiments from use of vacuum treatment to eliminate air bubbles. This split UV embossing process not only does not use an expensive molding machine, but also can improve the quality and the reliability of the fabricated waveguides. The split UV embossing process is also compatible with the lamination process in the fabrication of multilayer PCBs.

In accordance with one or more embodiments of the corresponding disclosure, various non-limiting aspects are described in connection with polymer optical waveguide devices. In an exemplary, non-limiting embodiment, a laminated polymer optical waveguide comprising a core polymer is described for communications systems.

In another exemplary, non-limiting embodiment, a method is described that can facilitate the production of a polymer optical waveguide. The method can include exposing the polymer to heat or optical radiation and filling the waveguide circuit patterns with an optically transparent core polymer.

In yet another exemplary, non-limiting embodiment, an apparatus is described that can facilitate the production of polymer optical waveguides. The apparatus can include a processor coupled to a memory to facilitate several operations, wherein the operations can include refining processes These and other embodiments or implementations are described in more detail below with reference to the drawings.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
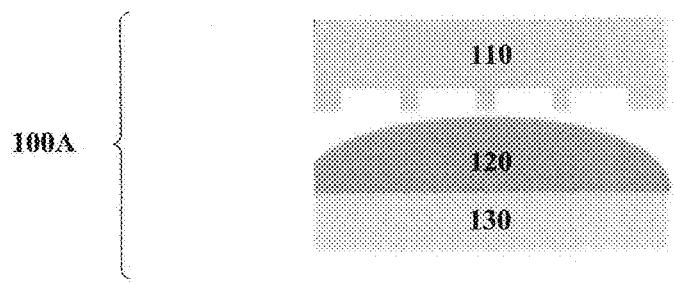
FIG. 1 illustrates a schematic of an example mold, polymer, and substrate.

In the following description, numerous specific details are set forth to provide a thorough understanding of various embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics may be combined in any suitable manner in one or more embodiments.

As utilized herein, terms "component," "system," "interface," and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, these components can execute from various computer readable media having various data structures stored thereon. The components can communicate via local and/or remote processes such as in accordance with a signal having one or more data packets (e.g., data from one component interacting with another component in a local system, distributed system, and/or across a network, e.g., the Internet, a local area network, a wide area network, etc. with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components. In an aspect, a component can emulate an electronic component via a virtual machine, e.g., within a cloud computing system.

The words "exemplary" and/or "demonstrative" are used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

In various embodiments, processes are used to create a polymer optical waveguide. The use of these processes allows for polymer optical waveguide creation utilizing separated embossing and UV radiation processes. Therefore, polymer optical waveguides can be created without the use or expense of special manufacturing equipment.

As an overview of the various embodiments presented herein, to correct for the above-identified deficiencies and/or other drawbacks of polymer optical waveguide processes, various embodiments are described herein to facilitate the creation of polymer optical waveguides.

FIGS. 1-11 illustrate apparatuses, methods, and articles of manufacture that facilitate polymer optical waveguide creation. For simplicity of explanation, the methods (or algorithms) are depicted and described as a series of acts. It is to be understood and appreciated that the various embodiments are not limited by the acts illustrated and/or by the order of acts. For example, acts can occur in various orders and/or concurrently, and with other acts not presented or described herein. Furthermore, not all illustrated acts may be required to implement the methods. In addition, the methods could alternatively be represented as a series of interrelated states via a state diagram or events. Additionally, the methods described hereafter are capable of being stored on an article of manufacture (e.g., a computer readable storage medium) to facilitate transporting and transferring such methods to computers. The term article of manufacture, as used herein, is intended to encompass a computer program accessible from any computer-readable device, carrier, or media, including a non-transitory computer readable storage medium.

Referring now to FIG. 1, illustrated is a schematic of an exemplary non-limiting embodiment comprising mold 110, polymer 120, and substrate 130. The mold 110, polymer 120, and substrate 130 can create the initial polymer waveguide setup 100A. Various types of molds 110 can be used, including but not limited to: molds comprising polydimethylsiloxane ("PDMS"), elastic molds, and/or uncured molds. A negative image of the desired waveguide circuit pattern can be engraved into the mold 110. Numerous polymers 120 can also be used, including but not limited to photo-hardenable polymers or photo hardenable polymers comprising UV-curable material. Photo hardenable polymers, can include but are not limited to: EpoClad from Microresist GmBh or EpoCore from Microresist GmBh. UV-curable polymers can include but are not limited to those containing: photoresist, epoxy, plastics, and/or polyimides. The polymer 120 can be deposited onto the substrate 130 during the initial preparation of the polymer waveguide setup 100A.

Several processes can also be used to form the polymer 120 on the substrate 130. The polymer can be formed or deposited by a mold, a drawdown technique, or spin coating. A drawdown technique stretches a polymer 120 by pulling it away faster than the natural production rate of the polymer 120 without the pulling. Spin coating is a procedure, which can be used to uniformly deposit thin films onto flat substrates 130. Usually a small amount of coating material can be applied on the center of the substrate 130, which can be either spinning at low speed or not spinning at all. The substrate 130 can then be rotated at high speed in order to spread the coating material by centrifugal force. Rotation can continue until the desired thickness of the film is achieved. The higher the angular speed of spinning, the thinner the film, which can usually be a thickness below ten nanometers.

The substrate 130 can include, but is not limited to: a plastic sheet or plate, a glass slide, a silicon wafer, or any solid platform. More specifically, the substrate 130 can be a bare FR4 board or a copper-coated FR4 board with or without surface oxidation. Once the polymer 120 has been prepared on the substrate 130, the polymer 120 can be solidified via drying by heat or a blowing process. The blowing process can produce a cellular structure in a variety of materials that undergo hardening or phase transition, such as polymers, plastics, and metals. The blowing process can typically be applied at a liquid stage, allowing the cellular structure to reduce material density, increase thermal and acoustic insulation, and increase relative stiffness of the original polymer. The solidification process before embossing provides two advantages: 1) the polymer 120 can be in a solid, yet elastic state (since it is not fully cured), so that the mold 110 can be kept in tight contact with it to ensure the fidelity of replication after the relief of the pressure; and 2) the very tight contact between the mold 110 and the polymer 120 does not allow air bubbles to be formed, so no vacuum treatment is needed.

Figure 2:
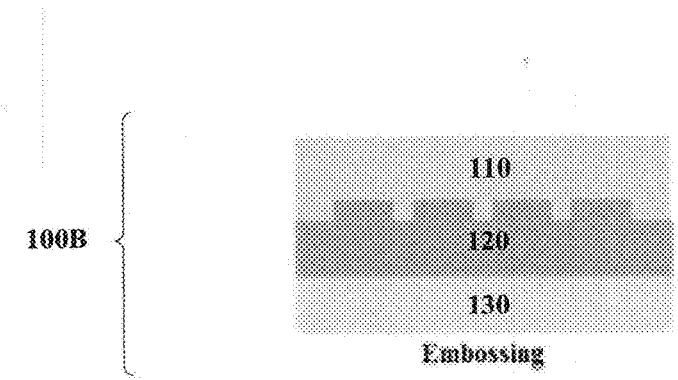
FIG. 2 illustrates a schematic of an example polymer embossing process using a mold, polymer, and substrate.

Referring now to FIG. 2, illustrated is a schematic of an exemplary non-limiting embodiment of a polymer embossing process. The embossing process 100B can allow a negative image of the desired waveguide circuit pattern on the mold 110 to create a positive image of the waveguide circuit pattern when the polymer 120 is embossed during its contact with the mold 110. The embossing process can create a positive image of the waveguide circuit pattern on the polymer 120 when the mold 110 is pressed onto the polymer 120 with a defined pressure. The pressure from the mold 110 can squeeze air out of the polymer 120 concurrently with the temperature being increased to soften the polymer 120 so that the mold 110 can be filled with the polymer 120. After the polymer 120 is embossed, the temperature can be adjusted as desired and the pressure between the mold 110 and the polymer 120 can be reduced.

Figure 3:
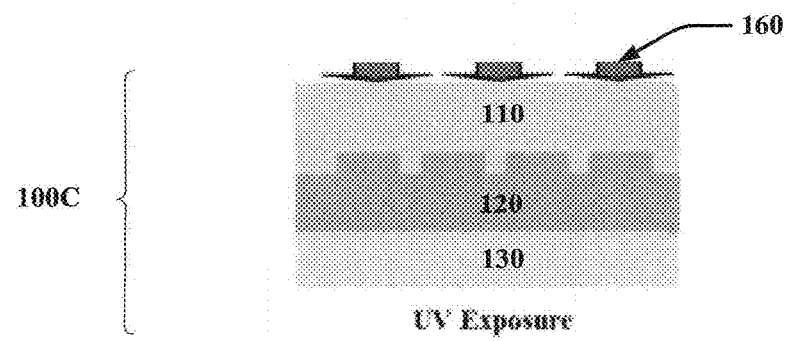
FIG. 3 illustrates a schematic of an example polymer being exposed to optical radiation after the embossing process.

Referring now to FIG. 3, illustrated is a schematic of an exemplary non-limiting embodiment comprising a polymer 120 being exposed to optical radiation 160 after the embossing process. Setup 100C can harden the polymer 120 by exposing the polymer 120 to optical radiation 160 after the pressure created by the mold 110 is released. The optical radiation 160 can be UV radiation or any other type of exposure applicable to polymer optical waveguides.

Figure 4:
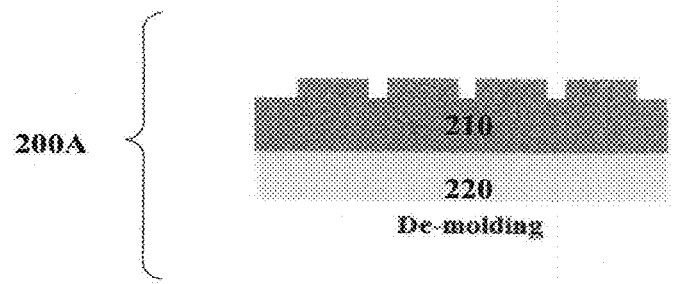
FIG. 4 illustrates a schematic of an example de-molding process.

Referring now to FIG. 4, illustrated is a schematic of an exemplary non-limiting embodiment of a de-molding process 200A. After the pressure from the mold 110 has been released and the polymer 120 has been exposed to optical radiation as shown in FIG. 3, the mold 110 can be removed during the de-molding process 200A leaving the optically radiated embossed polymer 210 on the substrate 220.

Figure 5:
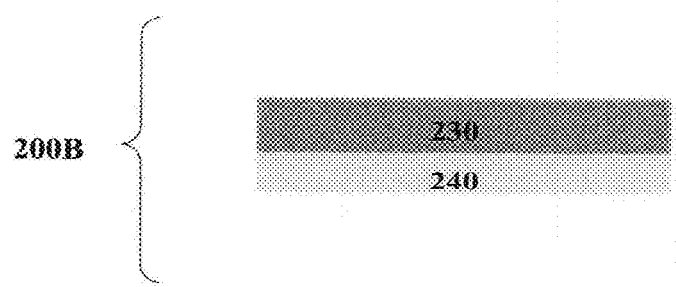
FIG. 5 illustrates a schematic of an example of a second polymer deposited onto a second substrate.

Referring now to FIG. 5, illustrated is a schematic of an exemplary non-limiting embodiment comprising a second polymer 230 deposited onto a second substrate 240. During the depositing process 200B, a second polymer 230 can be deposited onto a second substrate 240. Numerous polymers 230 can also be used including, but not limited to: photo-hardenable polymers, photo hardenable polymers comprising UV-curable material, or photo hardenable polymers comprising thermal-curable material. Photo hardenable polymers, can include, but are not limited to: EpoClad from Microresist GmBh or EpoCore from Microresist GmBh. UV-curable polymers or thermal-curable polymers can include, but are not limited to those containing: photoresist, epoxy, plastics, and/or polyimides.

Several processes can also be used to form the polymer 230 on the substrate 240. The polymer can be formed or deposited by a mold, a drawdown technique, or spin coating.

A drawdown technique stretches a polymer 230 by pulling it away faster than the natural production rate of the polymer 230 without the pulling. Spin coating is a procedure that can uniformly deposit thin films onto flat substrates 240. Usually a small amount of coating material can be applied on the center of the substrate 240, which can be either spinning at low speed or not spinning at all. The substrate 240 can then be rotated at high speed in order to spread the coating material by centrifugal force. Rotation can continue until the desired thickness of the film is achieved. The higher the angular speed of spinning, the thinner the film, which can usually be a thickness below ten nanometers.

The substrate 240 can include, but is not limited to: a plastic sheet or plate, a glass slide, a silicon wafer, or any solid platform. More specifically, the substrate 240 can be a bare FR4 board or a copper-coated FR4 board with or without surface oxidation. Once the polymer 230 has been deposited on the substrate 240, the polymer 230 can be solidified via drying by heat or a blowing process. The blowing process can produce a cellular structure in a variety of materials that undergo hardening or phase transition, such as polymers, plastics, and metals. The blowing process can typically be applied at a liquid stage, allowing the cellular structure to reduce material density, increase thermal and acoustic insulation, and increase relative stiffness of the original polymer.

Figure 6:
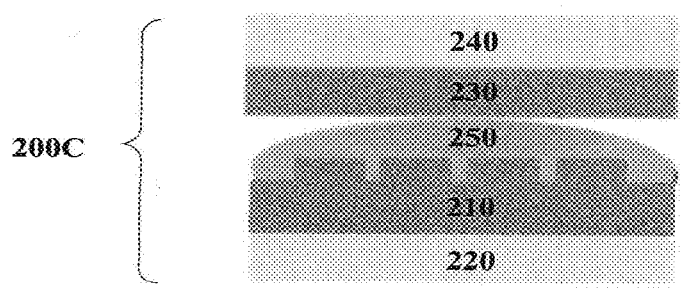
FIG. 6 illustrates a schematic of an example of an optically transparent core polymer situated between a UV radiated embossed polymer deposited onto a substrate and a second polymer deposited onto a second substrate.

Referring now to FIG. 6, illustrated is a schematic of an exemplary non-limiting embodiment comprising an optically transparent core polymer 250 situated between an optically radiated embossed polymer 210 deposited onto a substrate 220 and a second polymer 230 deposited onto a second substrate 240.

Process 200C can comprise filling the engraved channels of an optically radiated embossed polymer 210 deposited onto a substrate 220 with an optically transparent core polymer 250. The second polymer 230 deposited onto the second substrate 240 can then be deposited onto the optically transparent core polymer 250 where the second polymer 230 is in direct contact with the optically transparent core polymer 250. The optically transparent core polymer 250 can then be situated between the engraved channels of the optically radiated embossed polymer 210 and the second polymer 230. The optically radiated embossed polymer 210 deposited on substrate 220 and the second polymer 230 deposited on the second substrate 240 can have a refractive index lower than that of the optically transparent core polymer 250.

Figure 7:
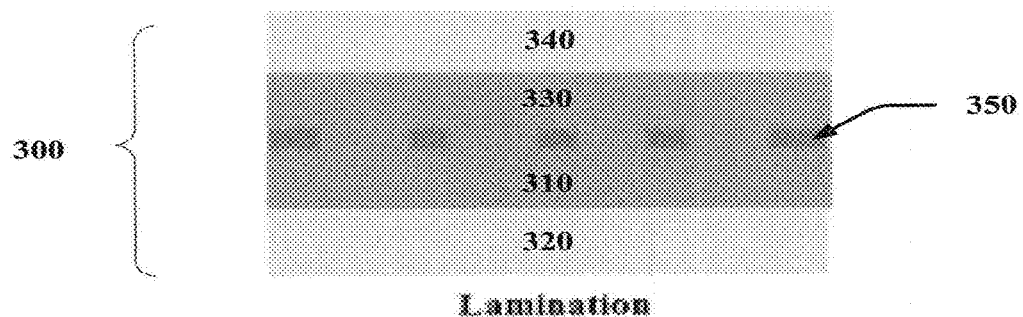
FIG. 7 illustrates a schematic of an example laminated polymer optical waveguide.

Referring now to FIG. 7, illustrated is a schematic of an exemplary non-limiting embodiment of a laminated polymer optical waveguide. After the optically transparent core polymer 350 is situated between the engraved channels of the optically radiated embossed polymer 310 and the second polymer 330, the optically radiated embossed polymer 310, the second polymer 330, and their respective substrates 320 340 can be subjected to a lamination process 300. The lamination process 300 can follow the steps of: 1) applying pressure; 2) increasing the temperature; and 3) after the core material is fully curd, releasing the pressure and reducing the temperature. The optically transparent core polymer 350 can also be soft-baked prior to lamination. Soft-baking is a process which can remove residual moisture by baking the optically transparent core polymer 350 at a defined temperature.

Figure 8:
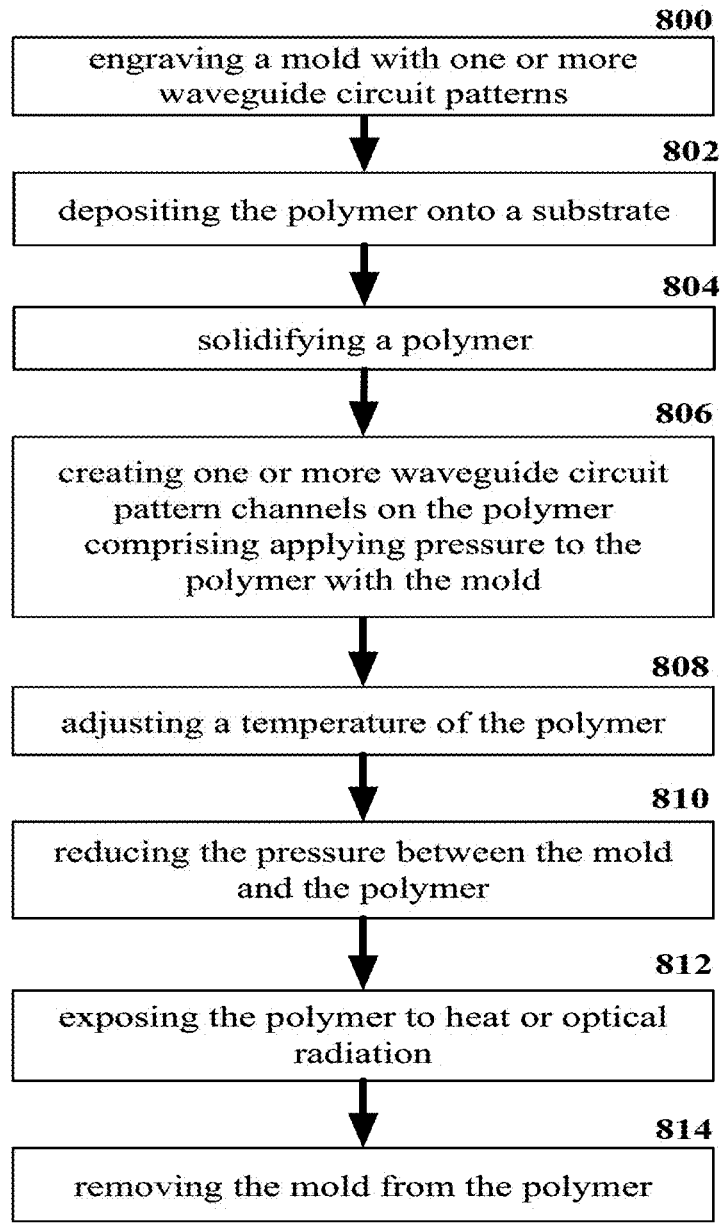
FIG. 8 illustrates a schematic process flow diagram of a method for creating polymer optical waveguides by separating the embossing and UV radiation processes.

Referring now to FIG. 8, illustrated is a schematic exemplary non-limiting embodiment of a process flow diagram of a method for creating polymer optical waveguides by separating the embossing and UV radiation processes. The process can begin by engraving a mold with one or more waveguide circuit patterns 800. Various types of molds can be used, including, but not limited to: molds comprising polydimethylsiloxane ("PDMS"), elastic molds, and/or uncured molds. A negative image of the desired waveguide circuit pattern can be engraved into the mold.

The mold can be used on numerous types of polymers including, but not limited to photo-hardenable polymers or photo hardenable polymers comprising UV-curable material. Photo hardenable polymers can include, but are not limited to: EpoClad from Microresist GmBh or EpoCore from Microresist GmBh. UV-curable polymers can include, but are not limited to those containing: photoresist, epoxy, plastics, and/or polyimides. The deposited polymer on the substrate at element 802 can then be solidified at element 804.

Several processes can also be used to deposit the polymer of element 802 on the substrate of element 802. The polymer can be formed or deposited by a mold, a drawdown technique, or spin coating. A drawdown technique stretches the polymer at element 802 by pulling it away faster than the natural production rate of the polymer at element 802 without the pulling. Spin coating is a procedure, which can be used to uniformly deposit thin films onto flat substrates. Usually a small amount of coating material can be applied on the center of the substrate at element 802, which can either be spinning at low speed or not spinning at all. The substrate at element 802 can then be rotated at a high speed in order to spread the coating material by centrifugal force. Rotation can be continued until the desired thickness of the film is achieved. The higher the angular speed of spinning, the thinner the film, which can usually be a thickness below ten nanometers. The substrate at element 802 can include but is not limited to: a plastic sheet or plate, a glass slide, a silicon wafer, or any solid platform. More specifically, the substrate at element 802 can be a bare FR4 board or a copper-coated FR4 board with or without surface oxidation.

The polymer can be solidified at element 804 via drying by heat or a blowing process. The blowing process can produce a cellular structure in a variety of materials that undergo hardening or phase transition, such as polymers, plastics, and metals. The blowing process can typically be applied at a liquid stage, allowing the cellular structure to reduce material density, increase thermal and acoustic insulation, and increase relative stiffness of the original polymer. The solidification process at element 804 before embossing provides two advantages: 1) the embossed polymer can be in a solid, yet elastic state (since it is not fully cured), so that the mold of element 800 can be kept in tight contact with it to ensure the fidelity of replication after the relief of the pressure; and 2) the very tight contact between the mold of element 800 and the polymer of element 804 does not allow air bubbles to be formed, so no vacuum treatment is needed.

At element 806 the embossing process can allow a negative image of the desired waveguide circuit pattern on the mold to create a positive image of the waveguide circuit pattern when the polymer is embossed during its contact with the mold. The embossing process can create a positive image of the waveguide circuit pattern on the polymer when the mold is pressed onto the polymer with a defined pressure as represented by element 806. The pressure from the mold can squeeze air out of the polymer concurrently with the temperature being increased to soften the polymer so that the mold can be filled with the polymer. After the polymer is embossed, the temperature can be adjusted as desired at element 808, and the pressure between the mold and the polymer can be reduced at element 810.

After the embossing process, the polymer can then be exposed to optical radiation at element 812 harden the polymer. The optical radiation exposure can be UV radiation or any other type of exposure applicable to polymer optical waveguides. The polymer can then be removed via a de-molding process at element 814, leaving the optically radiated embossed polymer on the substrate.

Figure 9:
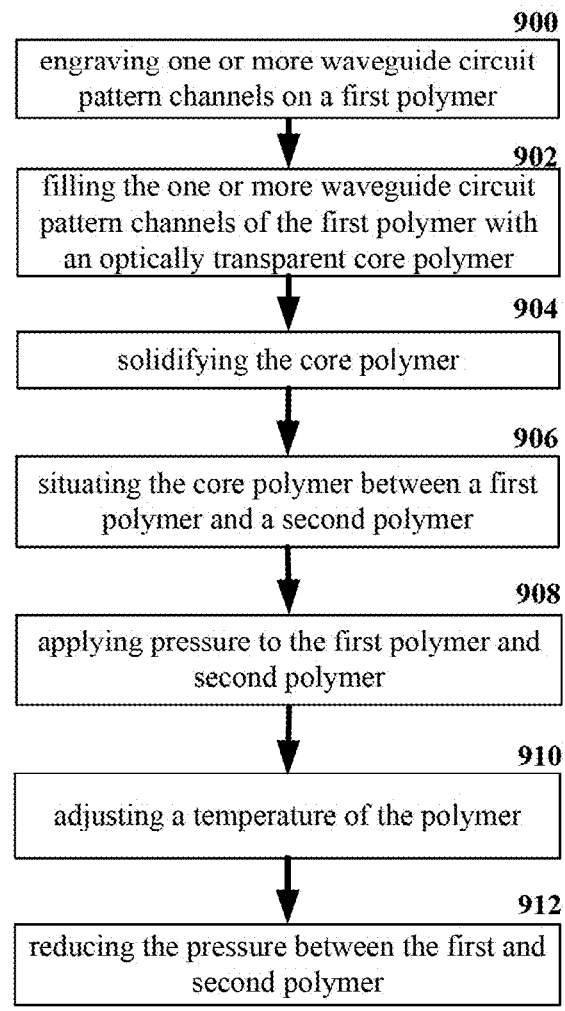
FIG. 9 illustrates a schematic process flow diagram of a method for creating polymer optical waveguides by separating the embossing and UV radiation processes and filling the waveguide circuit pattern channels with an optically transparent core polymer.

Referring now to FIG. 9, illustrated is a schematic process flow diagram of a exemplary non-limiting embodiment of a method for creating polymer optical waveguides by separating the embossing and UV radiation processes and filling the waveguide circuit pattern channels with an optically transparent core polymer. The process can begin by engraving a polymer with one or more waveguide circuit patterns 900. Numerous types of polymers may be used including, but not limited to, photo-hardenable polymers or photo hardenable polymers comprising UV-curable material. Photo hardenable polymers can include, but are not limited to: EpoClad from Microresist GmBh or EpoCore from Microresist GmBh. UV-curable polymers can include, but are not limited to those containing: photoresist, epoxy, plastics, and/or polyimides.

At element 902, the waveguide circuit pattern channels, engraved during element 900, can be filled with an optically transparent core polymer. The optically transparent core polymer can be solidified at element 904 via drying by heat or a blowing process. The blowing process can produce a cellular structure in a variety of materials that undergo hardening or phase transition, such as polymers, plastics, and metals. The blowing process can typically be applied at a liquid stage, allowing the cellular structure to reduce material density, increase thermal and acoustic insulation, and increase relative stiffness of the original polymer. The solidification process at element 904 before embossing provides two advantages: 1) the embossed polymer can be in a solid, yet elastic state (since it is not fully cured), so that the polymer of element 900 can be kept in tight contact with it to ensure the fidelity of replication after the relief of the pressure; and 2) the very tight contact between the polymer of element 900 and the optically transparent core polymer of element 904 does not allow air bubbles to be formed, so no vacuum treatment is needed.

During element 906 the optically transparent core polymer is situated between the engraved first polymer and a second polymer. Pressure can then be applied, at element 908, to the engraved first polymer and the second polymer with the optically transparent core polymer situation between. The remove air from the polymers, the pressure can be applied prior to the temperature adjustment of the polymers in element 910. However, the air can also be removed concurrently with the temperature being adjusted to soften the polymer. After the desired temperature is reached in element 910, the pressure between the engraved first polymer and a second polymer can be reduced at element 912. After the embossing process, the polymer can then be exposed to optical radiation to harden the polymer. The optical radiation exposure can be UV radiation or any other type of exposure applicable to polymer optical waveguides. The polymer can then be removed via a de-molding process, leaving the optically radiated embossed polymer on the substrate.

It is noted a computer environment can be utilized to execute or implement portion(s) of the various embodiments described herein, e.g., switching or voltage control. Those skilled in the art will recognize that the various aspects, such as switching or voltage control, can be implemented as software, hardware, or in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media. Further, computer instructions/operations can be stored in memory in the form of non-transitory, or tangible, computing elements (e.g., computer readable storage medium), where such instructions/operations can be executed, e.g., by a processor, to facilitate operation of one or more exemplary, non-limiting embodiments, as presented herein.

As used in this application, the terms "component," "system," "platform," "layer," "controller," "terminal," "station," "node," "interface" are intended to refer to a computer-related entity or an entity related to, or that is part of, an operational apparatus with one or more specific functionalities, wherein such entities can be either hardware, a combination of hardware and software, software, or software in execution. For example, a component can be, but is not limited to being, a process running on a processor, a processor, a hard disk drive, multiple storage drives (of optical or magnetic storage medium) including affixed (e.g., screwed or bolted) or removably affixed solid-state storage drives; an object; an executable; a thread of execution; a computer-executable program, and/or a computer. By way of illustration, both an application running on a server and the server can be a component. One or more components can reside within a process and/or thread of execution, and a component can be localized on one computer and/or distributed between two or more computers. Also, components as described herein can execute from various computer readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that provides at least in part the functionality of the electronic components. As further yet another example, interface(s) can include input/output (I/O) components as well as associated processor, application, or Application Programming Interface (API) components. While the foregoing examples are directed to aspects of a component, the exemplified aspects or features also apply to a system, platform, interface, layer, controller, terminal, and the like.

What has been described above includes examples of the various embodiments. It is, of course, not possible to describe every conceivable combination of components or methodologies for purposes of describing the disclosed subject matter, but one of ordinary skill in the art may recognize that many further combinations and permutations of the various embodiments are possible. Accordingly, the disclosed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the disclosed subject matter. In this regard, it will also be recognized that the disclosed subject matter includes a system as well as a computer-readable medium having computer-executable instructions for performing the acts and/or events of the various methods of the disclosed subject matter.

In addition, while a particular feature of the disclosed subject matter may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising".

As used herein, the terms "to infer" and "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

In addition, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Furthermore, the term "set" as employed herein excludes the empty set; e.g., the set with no elements therein. Thus, a "set" in the subject disclosure includes one or more elements or entities. As an illustration, a set of controllers includes one or more controllers; a set of data resources includes one or more data resources; etc. Likewise, the term "group" as utilized herein refers to a collection of one or more entities; e.g., a group of nodes refers to one or more nodes.

In this application, the word "exemplary" is used to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding FIGs, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A product, comprising:
a first polymer deposited on a first substrate wherein the first polymer has been solidified prior to being engraved with one or more waveguide circuit pattern channels, wherein the first polymer is created by applying pressure to the first polymer via a mold, and wherein the first polymer comprises a first EpoClad from Microresist GmBh;
a second polymer deposited on a second substrate; and
a third polymer situated in the one or more waveguide circuit pattern channels, wherein the third polymer comprises a second EpoClad from Microresist GmBh, and wherein the second polymer is in direct contact with the third polymer.

2. The product of claim 1,
wherein the third polymer is an optically transparent core polymer.

3. The product of claim 2,
wherein the optically transparent core polymer is between the first polymer and the second polymer, and wherein the optically transparent core polymer is solidified before lamination.

4. The product of claim 1, wherein the first substrate comprises a silicon wafer.

5. The product of claim 4, wherein the mold is a first mold, and the second polymer is formed by a second mold.

6. The product of claim 1, wherein the first substrate or the second substrate comprises a copper-coated FR4 board.

7. The product of claim 1, wherein the second polymer comprises EpoCore from Microresist GmBh.

8. The product of claim 1, wherein at least one of the first polymer or the second polymer comprises an ultraviolet curable polymer.

9. The product of claim 2, wherein the optically transparent core polymer comprises EpoCore from Microresist GmBh.

10. The product of claim 2, wherein the first polymer and the second polymer comprise a refractive index lower than another refractive index of the optically transparent core polymer.

11. The product of claim 1, wherein the second polymer comprises an ultraviolet curable material.

12. The product of claim 1, wherein the second polymer comprises a third EpoClad from Microresist GmBh.

13. The product of claim 1, wherein the first polymer and the second polymer are laminated.

14. A device, comprising:
a first polymer that is optically radiated deposited on a first substrate that comprises a first copper-coated FR4 board, wherein the first polymer has been solidified prior to being engraved with one or more waveguide circuit pattern channels, wherein the first polymer is created by applying pressure to the first polymer via a mold and concurrently increasing a temperature of the first polymer;
a second polymer deposited on a second substrate wherein the second substrate comprises an EpoCore from Microresist GmBh; and
a third polymer situated in the one or more waveguide circuit pattern channels, wherein the third polymer comprises a second copper-coated FR4 board, and wherein the second polymer is in contact with the third polymer.

15. The device of claim 14, wherein the first polymer undergoes a blowing process to dry the polymer for solidification.

16. The device of claim 14, wherein the third polymer is an optically transparent core polymer.

17. The device of claim 16, wherein the first polymer comprises a first refractive index lower than a second refractive index of the optically transparent core polymer.

18. The device of claim 16, wherein the second polymer comprises a first refractive index lower than a second refractive index of the optically transparent core polymer.

19. A product, comprising:
a first polymer deposited on a first substrate that comprises a first bare FR4 board, wherein the first polymer has been solidified prior to being engraved with one or more waveguide circuit pattern channels, wherein the first polymer is created by applying pressure to the first polymer via a mold;
a second polymer deposited on a second substrate, wherein the second polymer comprises EpoClad from Microresist GmBh, and wherein the second substrate comprises a second bare FR4 board; and
a third polymer situated in the one or more waveguide circuit pattern channels, wherein the third polymer is an optically transparent core polymer, wherein the third polymer comprises EpoCore from Microresist GmBh, and wherein the second polymer is in contact with the third polymer.

20. The product of claim 19, wherein at least one of the first polymer or the second polymer comprises an ultraviolet curable polymer.

* * * * *